Sept. 24, 1957  J. W. JACOBS  2,807,246
ENGINE FAN CONTROL
Filed March 26, 1954  3 Sheets-Sheet 1
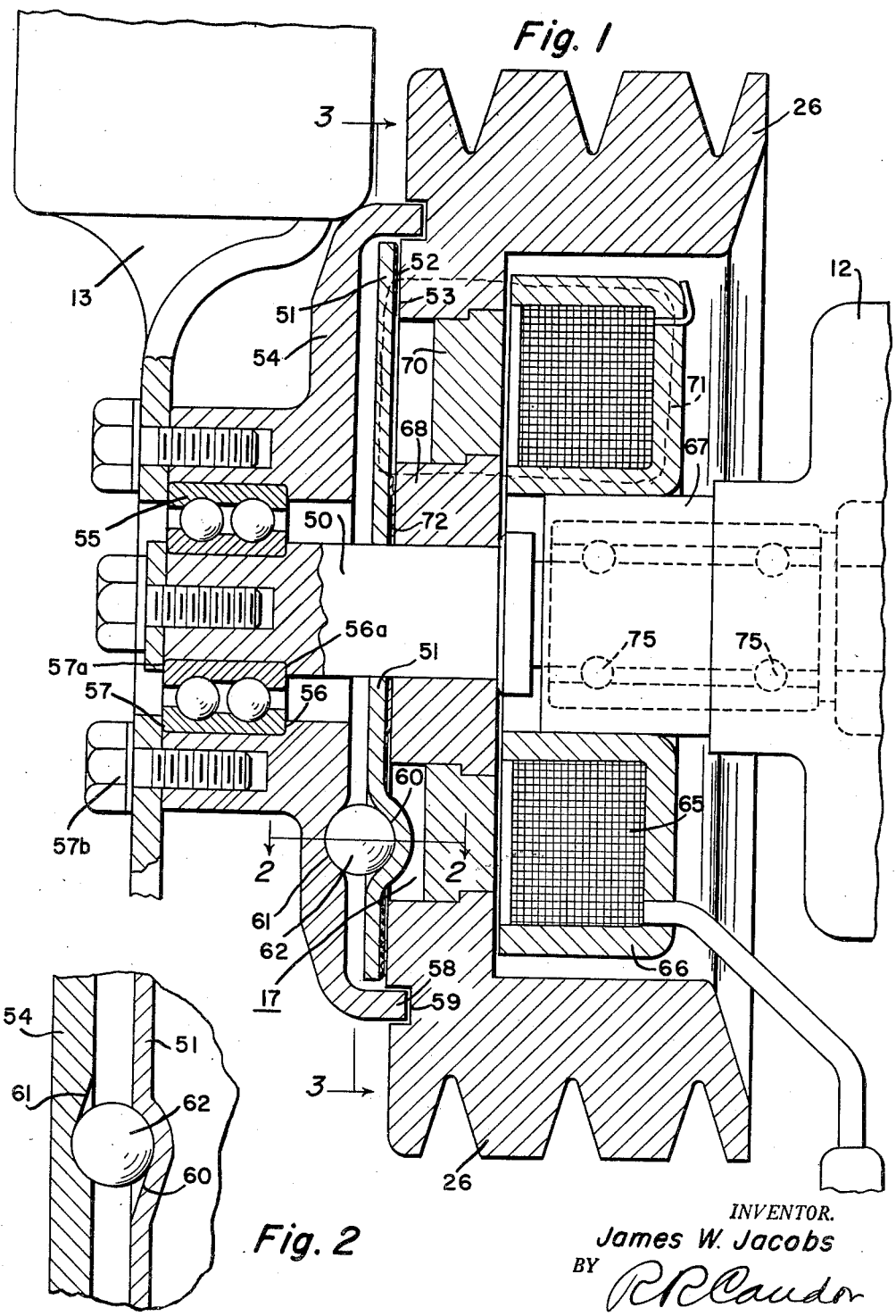
INVENTOR.
James W. Jacobs
BY
R. R. Cauder
Attorney Sept. 24, 1957

J. W. JACOBS 2,807,246

ENGINE FAN CONTROL

Filed March 26, 1954

INVENTOR.
James W. Jacobs
BY
R R Caudor
Attorney

Sept. 24, 1957     J. W. JACOBS     2,807,246
ENGINE FAN CONTROL

Filed March 26, 1954     3 Sheets-Sheet 3

INVENTOR.
James W. Jacobs
BY
*R R Candor*
Attorney

United States Patent Office 2,807,246
Patented Sept. 24, 1957

2,807,246

ENGINE FAN CONTROL

James W. Jacobs, Dayton, Ohio, assignor to General Motors Corporation, Detroit, Mich., a corporation of Delaware Application March 26, 1954, Serial No. 418,867

5 Claims. (Cl. 123—41.12)

This invention relates to refrigerating apparatus and more particularly to apparatus for air conditioning an automobile or the like.

An object of this invention is to provide an automatic radiator fan releasing means to reduce the load on the engine when the car is traveling at sufficient speed to cool the radiator by the flow of air due to car speed and to make the power thus saved available for use in air conditioning the car and in maintaining car speed.

Another object of this invention is to provide an automobile with an air conditioning system in which the compressor is automatically connected and disconnected from the engine in response to conditions produced by the car cooling system and in which the load on the engine is reduced at high car speed by automatically disconnecting the radiator cooling fan at high speed in response to speed of the car and/or engine water temperature.

Another object of this invention is to provide a magnetically connected and disconnecte clutch for the fan of an engine cooling system or the like, which clutch is controlled in response to a speed condition.

Another object of this invention is to provide and engine construction which drives the water pump continnetically connected and disconnected clutch for the fan uously and drives the radiator fan intermittently in response to car speed, engine temperature or the like.

Further objects and advantages of the present invention will be apparent from the following description, reference being had to the accompanying drawings wherein a preferred from of the invention is clearly shown.

In the drawings:

Figure 1 is a cross-section of the combined magnetic fan clutch and water pump drive.

Figure 2 is a cross-section taken along the line 2—2 of Figure 1.

Figure 3:
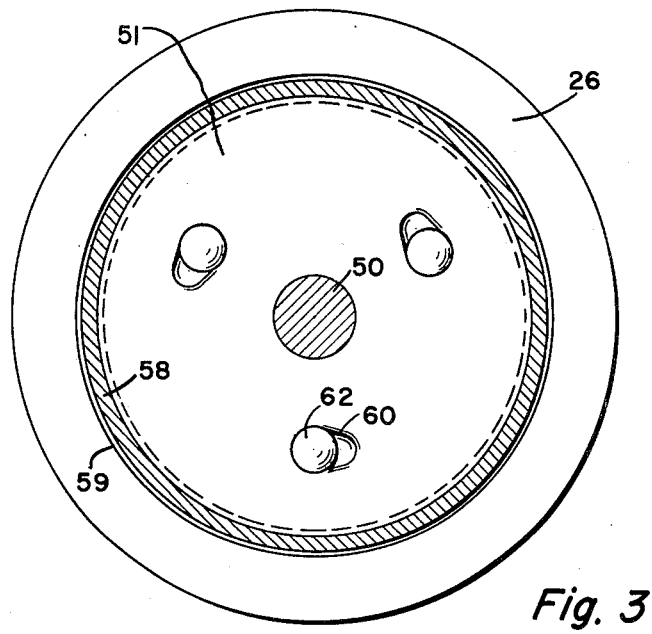
Figure 3 is a reduced cross-section taken along the line 3—3 of Figure 1.
Figure 5:
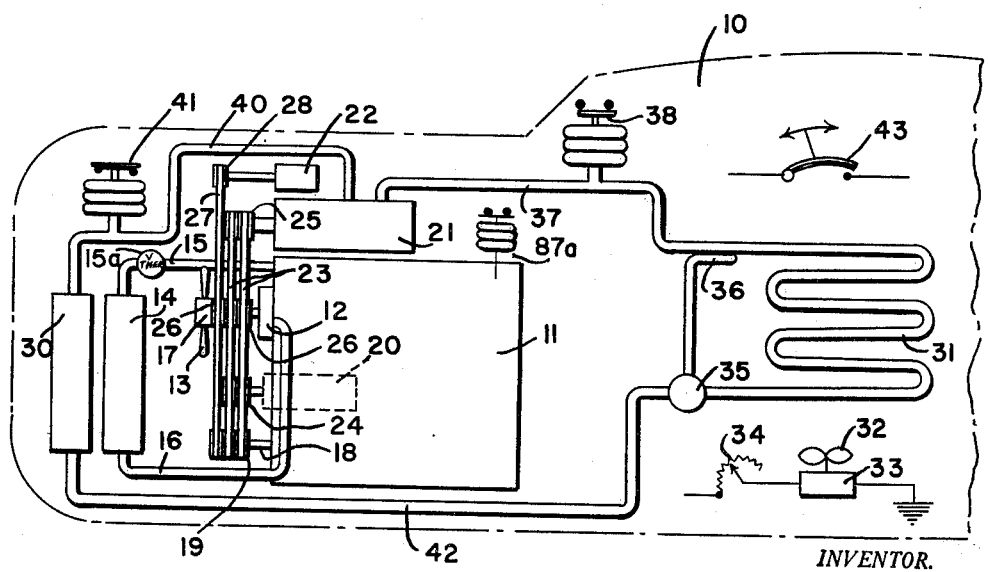
Figure 5 is a diagrammatic representation of the car cooling system.
Figure 4:
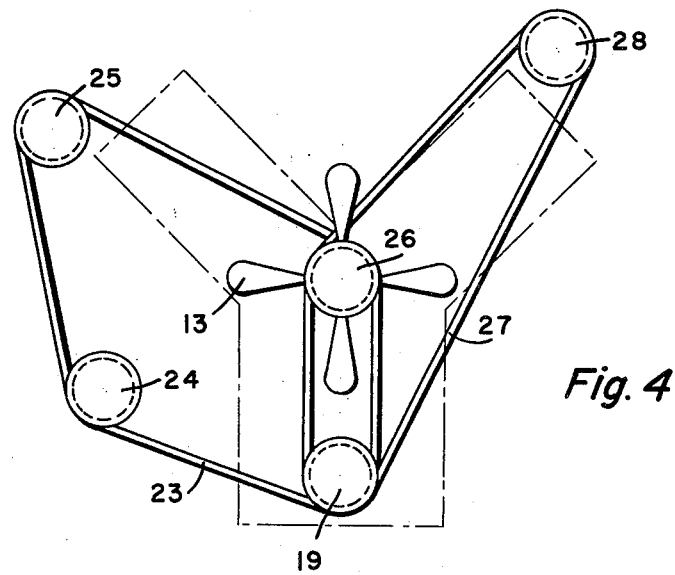
Figure 4 is a diagrammatic front view of the automobile engine and the elements driven by belts in front of the engine.

An automobile 10 is provided with an engine 11 for driving the automobile. The cooling system for the engine includes a water pump 12, fan 13, radiator 14 and water flow conduits 15, 16 and radiator thermostat 15a. In addition, an automatic magnetic clutch 17 disconnects the fan 13 automatically at high speed and connects the fan at low speed in response to speed of the car or connects the fan at high engine temperatures and disconnects the fan at low engine temperatures. The engine drives the water pump 12 continuously as long as the engine operates.

The crankshaft 18 of the engine drives a pulley 19 which is connected by belting to the generator 20, water pump 12, fan 13, compressor 21 and power steering oil pump 22. Two belts 23 preferably connect the crank pulley 19 to the generator pulley 24, compressor magnetic clutch pulley 25, and magnetic clutch pulley 26. A single belt 27 connects the crank pulley 19, magnetic clutch pulley 26 and pulley 28 of the oil pump 22.

The air conditioning system for the automobile includes the compressor 21, condenser 30 and evaporator 31 in the usual refrigerant flow relationship. A blower 32 for driving air over the evaporator is driven by a motor 33 with speed adjustment by the manually adjustable rheostat 34. The evaporator 31 is provided with the usual automatic thermostatic expansion valve 35 having a thermostatic bulb control 36 at the outlet of the evaporator. The suction line 37 of the refrigerant system which connects the evaporator 31 with the compressor 21 is provided with a low pressure control switch 38. The compressor is stopped by switch 38 whenever the evaporator temperature falls near the freezing point and is started again when evaporator temperature rises sufficiently. The compressor refrigerant discharge line 40 is provided with a high pressure switch 41 which automatically opens and stops the compressor when the refrigerant head pressure in line 40 rises above a safe limit. The compressor starts again when the head pressure drops to a safe limit. The line 40 connects the compressor with the condenser 30, and the line 42 connects the condenser 30 with the evaporator 31. A manually adjustable thermostat 43 controls the starting and stopping of the compressor 21 in response to air conditions in the passenger compartment of the automobile.

The drive pulley 26 of the magnetic clutch 17 is rotatably and axially fixed on the water pump driven shaft 50, which operates the pump 12 continuously as long as the engine operates. The shaft 50 is provided with a clutch which automatically connects the fan 13 with the engine. To this end a clutch disk 51 is rotatable about and longitudinally movable on the pump shaft 50. The driven friction surface 52 of the disk 51 engages and disengages the substantially axially directed drive surface 53 of the driving pulley or member 26. A spread reaction disk 54 is mounted rotationally free on the shaft 50, and has an axial spacing limit with respect to the pulley 26. This is accomplished by mounting the disk 54 on a thrust ball bearing 55 which is axially fixed on the shaft 50 and reaction disk 54 by means of the shoulders 56, 57, 56a, 57a. The fan 13 is fixedly mounted on the spread reaction disk 54 by bolts 57b. If desired, the disk 54 may extend at 58 into an annular notch 59 in the pulley 26 to enclose and protect the parts within the magnetic clutch.

Spreader and relative rotation locking means are placed between the disks 51 and 54, which means is energized by small initial relative rotation of the disks. This may take the form of three sets of similar teardrop grooves 60 and 61 which contain the balls 62. A slight relative rotation between the disks 52 and 54 spread them apart and provides a drive from the pulley 26 to the fan 13 through friction surfaces 52 and 53 and the ball and groove constructions.

Means are provided for moving the clutch disk 51 longitudinally. Such means includes stationary solenoid winding 65 provided with an annular magnetic core 66 fixed on the stationary cantilever bearing casing 67 of the water pump 12. The core 66, pulley 26, retaining ring 68 and disk 51 are made of magnetizable material such as soft steel or cast iron. The ring 70 is made of non-magnetic material such as aluminum or stainless steel. Under these conditions, when the magnet 65 is energized, a magnetic flux 71 is established which creates a strong rightward magnetic pull on the disk 51 longitudinally of the shaft 50. A weak annular spring disk 72 creates a leftward longitudinal bias on the disk 51, in opposition to the magnetic pull. When the magnet 65 is deenergized, the spring disk 72 moves disk 51 to the left to the position shown in Figure 1, and when the magnet is energized, the disk 51 is pulled magnetically to the right to engage friction surfaces 52 and 53. This produces a small initial relative rotation between the disks 51 and 54 to engage the drive from the pulley 26 to the fan 13. The magnet 65 is deenergized in response to high car speed or low engine temperature and is energized in response to low car speed or high engine temperature, and accordingly the fan 13 is disconnected and connected from the engine in response to such conditions automatically.

The water pump 12 rotationally supports the shaft 50 by means of the cantilever outer casing 67 containing the ball bearings 75 to hold the shaft 50 in a rotational cantilever condition. The pump 12 is bolted to the engine block in the usual manner.

Figure 6:
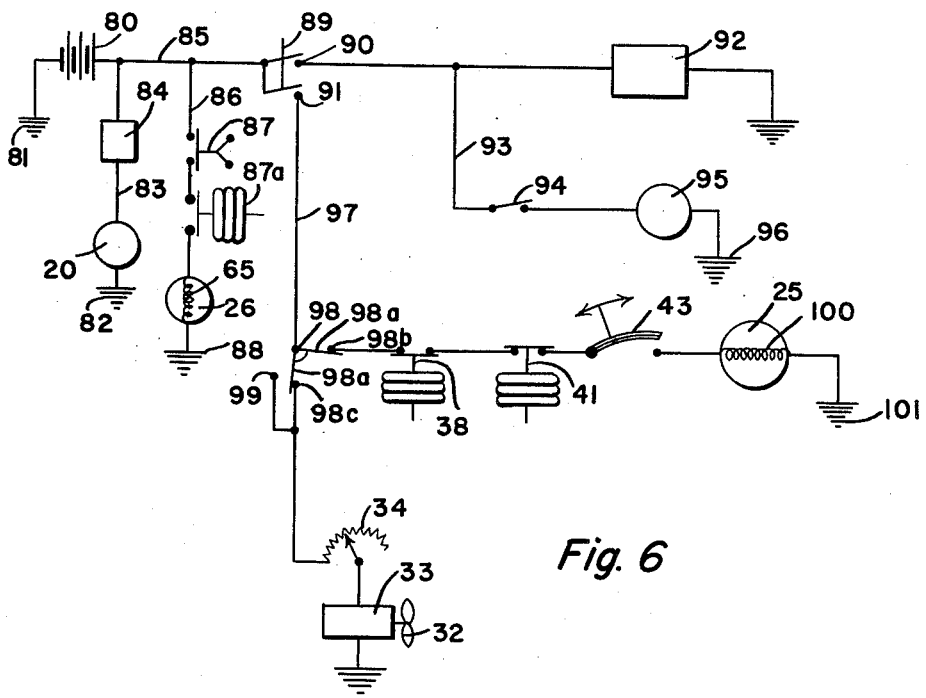
Figure 6 is a wiring diagram for the system shown in Figure 5.

The electrical system for controlling the various elements is shown in Figure 6 and includes the battery 80 which is grounded at 81 to the frame of the car. The generator 20 is grounded at 82 and has its positive lead 83 connected by the usual current and voltage regulator and cutout relay 84 with the positive line 85 of the battery 80. A branch 86 is connected by the car speed responsive switch 87 and the temperature responsive switch 87a with the magnet 65 of the fan magnetic clutch pulley 26. The other terminal of the magnet 65 is grounded at 88. The switch 87 preferably opens automatically at high car speed and closes at low car speed as required to maintain the engine at proper temperature, and the switch 87a opens automatically at low engine temperature and closes at high engine temperature. A combined ignition and air conditioning switch 89 is movable to open and close the contacts 90 and 91. The contact 90 energizes the usual ignition system 92 of the engine and energizes the lead 93 feeding the automatic starter control 94 and the starter motor 95, grounded at 96. The air conditioning lead 97 has a manual air conditioning switch 98 which has two blades 98a. It is movable to three positions. Movement of the switch 98 to its rightward position closes contacts 98b and 98c. In this position it energizes the solenoid 100 of the compressor clutch pulley 25, the solenoid 100 being grounded at 101. This energizes the air conditioning system. The compressor clutch 25 is somewhat similar to clutch 17 and preferably may be of the character disclosed in my simultaneously filed application for refrigerating apparatus Serial No. 418,931. Energization of magnet 100 drives the compressor 21 and deenergization of the magnet 100 disconnects the compressor. The high pressure switch 41 deenergizes the magnet 100 whenever the refrigerant pressures in the compressor discharge line 40 are too high and energizes the magnet when refrigerant pressures fall. The low pressure switch 38 deenergizes the magnet 100 when the refrigerant pressures in the suction line 37 fall below a pressure corresponding to a freezing temperature in the evaporator 31, and reenergizes the magnet when evaporator temperatures rise the desired amount. The thermostat 43 energizes magnet 100 at high air temperature and deenergizes the magnet 100 at low air temperature in response to air temperatures in the passenger compartment of the car to maintain the desired air temperature in the compartment. Energization of magnet 100 causes compressor 20 to operate, and deenergization of the magnet stops the compressor. Movement of switch 98, 98a to its farthest rightward position also energizes the blower motor 33 through contact 98c. The speed of the blower 32 can be regulated manually by the adjustable rheostat 34. If ventilation is desired without air conditioning, the manual switch 98, 98a is moved to its farthest leftward position so that contact 99 only is closed, and then the blower 32 is operated while the air conditioning system remains idle. Movement of switch 98, 98a to its intermediate "off" position stops both the compressor 21 of the air conditioning system and the blower motor 33.

Deenergization of solenoid 65 at high car speeds by centrifugal switch 87 removes the load of fan 13 at high speeds when fan operation is not required, and makes the saved engine power available to operate the air conditioning system and to maintain the high speed of the car. Also the control of the fan in response to engine temperature further reduces the use of the fan even during low speed operation to the needs of the engine coolant so that the fan will not operate if the engine is operating at a safe temperature.

In the operation, the engine 11 is started in the usual manner after the closing of switch 89. The switch 98 is turned to the air conditioning position, the ventilating position or the off position as desired. The centrifugal switch 87 remains closed as long as the car speed is below a predetermined value to cause the fan 13 to be driven. Likewise, the switch 87a causes the fan 13 to operate when engine temperature is higher than a predetermined value. When the car speed exceeds the predetermined value, centrifugal switch 87 opens and prevents engine drive of the fan 13. Likewise, switch 87a prevents fan drive when engine temperature is below predetermined value.

The combined fan clutch and water pump drive pulley 26 is continuously rotated by belts 23 and 27 as long as the engine runs. The shaft 50 and water pump 12 likewise operate as long as the engine runs, as there is a press fit between pulley 26, rings 68, 70 and shaft 50. When the car speed is below the predetermined value, and/or the engine temperature is above a predetermined value, the switches 87, 87a remain closed and solenoid 65 remains energized, and the magnetic flux 71 pulls disk 51 to the right to engage friction surfaces 52, 53. This causes an initial relative rotation between disks 51 and 54, and causes a spreading action at the ball and groove constructions 60, 61, 62. This causes a positive friction drive to the fan 13 through friction surfaces 52, 53, ball and groove constructions 60, 61, 62 and disk 54. Where the car speed exceeds the predetermined value, and/or the engine temperature or below a predetermined value, switches 87 and/or 87a open to deenergize solenoid 65. Thereupon, disk 51 is moved leftward by spring 72 and the fan drive is disengaged at friction surfaces 52, 53, and the fan 13 is no longer engine driven. The power saved when the fan 13 is released is available for air conditioning and for maintaining high car speed or the like.

While the form of embodiment of the invention as herein disclosed constitutes a preferred form, it is to be understood that other forms might be adopted as may come within the scope of the claims which follow.

What is claimed is as follows:

1. In combination: an automobile including an engine for driving said automobile; a cooling fan on and driven by said engine and freely rotatable about a shaft driven by said engine; a clutch between said engine and fan coaxial with said shaft; an electromagnet stationarily mounted coaxial with said shaft and locking and unlocking said clutch; and means automatically responsive to a speed condition for energizing and deenergizing said electromagnet.

2. In combination: an engine for an automobile or the like; a water cooling system for said engine including a water pump; a cantilever water pump shaft on said pump; a driving pulley rotatable and axially fixed on said pump shaft and having a substantially axially directed drive surface; a clutch disk rotatable about and longitudinally movable on said pump shaft and engageable with said drive surface; a spread reaction disk mounted longitudinally fixed and rotationally free on said pump shaft; a fan fixedly mounted on said spread reaction disk; means operative upon initial relative rotation of said disks for locking said disks together and for forcing said clutch disk into tight engagement with said driving pulley; and a stationary electromagnet for initially moving said clutch disk longitudinally into engagement with said pulley to thereby initiate said relative rotation.

3. In combination: an engine for an automobile or the like; a water cooling system for said engine including a water pump; a cantilever water pump shaft on said pump; a driving pulley rotatably and axially fixed on said pump shaft and having a substantially axially directed drive surface; a clutch disk rotatable about and longitudinally movable on said pump shaft and engageable with said drive surface; a spread reaction disk mounted longitudinally fixed and rotationally free on said pump shaft; a fan fixedly mounted on said spread reaction disk; means operative upon initial relative rotation of said disks for locking said disks together and for forcing said clutch disk into tight engagement with said driving pulley; and a stationary annular electromagnet coaxial with said shaft for initially moving said clutch disk longitudinally into engagement with said pulley to thereby initiate said relative rotation.

4. In combination: an engine for an automobile or the like; a water cooling system for said engine including a water pump; a cantilever water pump shaft on said pump; a driving pulley rotatably and axially fixed on said pump shaft and having a substantially axially directed drive surface; a clutch disk rotatable about and longitudinally movable on said pump shaft and engageable with said drive surface; a spread reaction disk mounted longitudinally fixed and rotationally free on said pump shaft; a fan fixedly mounted on said spread reaction disk; means operative upon initial relative rotation of said disks for locking said disks together and for forcing said clutch disk into tight engagement with said driving pulley; a stationary annular electromagnet coaxial with said shaft for initially moving said clutch disk longitudinally into engagement with said pulley to thereby initiate said relative rotation; and means for energizing said electromagnet in response to the speed of said automobile.

5. In combination: a driven shaft; a driving member drivingly connected to said shaft; a clutch disk rotatable about and longitudinally movable on said driven shaft and engageable with said driving member; a spread reaction disk rotationally free on said driven shaft and having an axial spacing limit with respect to said driving member; means operative upon initial relative rotation of said disks for locking said disks together and for forcing said clutch disk into tight engagement with said driving pulley; and a stationary electromagnet for initially moving said clutch disk longitudinally into engagement with said pulley to thereby initiate said relative rotation.

References Cited in the file of this patent

UNITED STATES PATENTS

| | | |
|---|---|---|
| 1,481,306 | Stuart | Jan. 22, 1924 |
| 1,943,317 | Hulse | Jan. 16, 1934 |
| 1,943,964 | Hulse | Jan. 16, 1934 |
| 2,181,053 | Hamilton | Nov. 21, 1939 |
| 2,214,391 | Weydell | Sept. 10, 1941 |
| 2,319,310 | Euwer | May 18, 1943 |
| 2,396,000 | Findley | Mar. 5, 1946 |
| 2,401,426 | Killoran | June 4, 1946 |
| 2,449,888 | Edwards | Sept. 21, 1948 |
| 2,452,264 | Russell | Oct. 26, 1948 |
| 2,506,520 | Spase | May 2, 1950 |
| 2,506,547 | Findley | May 2, 1950 |
| 2,530,180 | Russell | Nov. 14, 1950 |
| 2,606,638 | Russell | Aug. 12, 1952 |
| 2,607,327 | Lee | Aug. 19, 1952 |